United States Patent [19]
Iwasaki

[11] Patent Number: 5,815,599
[45] Date of Patent: Sep. 29, 1998

[54] IRREVERSIBLE COMPRESSION SYSTEM AND METHOD FOR BIT MAP IMAGES

[75] Inventor: Takumi Iwasaki, Nagano, Japan

[73] Assignee: Seiko Epson Corporation, Tokyo, Japan

[21] Appl. No.: 501,464

[22] Filed: Jul. 12, 1995

[30] Foreign Application Priority Data

Jul. 27, 1994 [JP] Japan .................................. 6-175737

[51] Int. Cl.⁶ .............................. G06K 9/36; G06K 9/40; H04N 1/40
[52] U.S. Cl. ........................... 382/232; 382/268; 358/456
[58] Field of Search .................................. 382/267, 268, 382/269, 275, 232; 358/429, 433, 534, 535, 455, 456, 457, 460, 465; 348/384, 390; 345/189, 202, 133, 201; 395/108, 114, 116

[56] References Cited

U.S. PATENT DOCUMENTS

| | | | |
|---|---|---|---|
| 4,660,029 | 4/1987 | Houda et al. | 345/201 |
| 4,663,729 | 5/1987 | Matick et al. | 345/201 |
| 5,101,443 | 3/1992 | Behrmann-Poitiers | 382/299 |
| 5,166,809 | 11/1992 | Surbrook | 358/456 |
| 5,267,054 | 11/1993 | Chang et al. | 358/456 |
| 5,315,407 | 5/1994 | Sakamoto et al. | 358/456 |
| 5,363,213 | 11/1994 | Coward et al. | 358/455 |
| 5,394,430 | 2/1995 | Zhang | 358/455 |

FOREIGN PATENT DOCUMENTS 5-130585  5/1993  Japan ............................. H04N 7/133
5-316494  11/1993  Japan ............................. H04N 7/133

OTHER PUBLICATIONS

"Adaptive Transform Coding of Images Based on Variable-Shape-Blocks", Itoh, S., et al., Signl Processing VI: Theories and Applications, pp. 1251–1254, Proceedings of EUSIPCO–92, Sixth European Signal Processing Conference, Brussels, Belgium, Aug. 24–27, 1992.

"Adaptive transform image coding based on variable-shaped-block-segmentation with smoothing filter", Itoh, S., Visual Communications and Image Processing '92, vol. 1818, pp. 1338–1349, SPIE—The International Society of Optical Engineering, Boston, Massacusetts, 18–20 Nov., 1992.

European Search Report dated 26 Mar. 1996 for Application No. 95305310.5.

Primary Examiner—Leo Boudreau
Assistant Examiner—Wenpeng Chen
Attorney, Agent, or Firm—Morgan, Lewis & Bockius LLP

[57] ABSTRACT

An irreversible compression system and method, includes fetching cells of bit map data from first and second adjacent blocks of bit map data, each of the fetched cells having a predetermined cell size, and each of the fetched cells is converted to compressed code. When the size of the first block of bit map data is indivisible by the predetermined cell size, a first incomplete cell having a first reduced size is fetched from the first block and a second incomplete cell is fetched from the second block, the second incomplete cell being adjacent the first incomplete cell and having a second reduced size such that the sum of the first reduced size and the second reduced size is equal to the predetermined cell size.

6 Claims, 12 Drawing Sheets

ORIGINAL DATA

| 13 | 15 | 9  | 15 | 3  | 14 | 2  | 10 | 1  | 8  | 0 | 4 | 0 | 0 |
| 15 | 11 | 15 | 9  | 14 | 3  | 12 | 2  | 9  | 0  | 6 | 0 | 2 | 0 |
| 14 | 14 | 6  | 14 | 4  | 12 | 4  | 6  | 2  | 6  | 0 | 4 | 0 | 0 |
| 13 | 13 | 13 | 11 | 7  | 10 | 4  | 9  | 3  | 5  | 2 | 2 | 0 | 0 |
| 15 | 13 | 11 | 13 | 10 | 7  | 10 | 3  | 7  | 3  | 4 | 2 | 2 | 0 |
| 13 | 13 | 13 | 11 | 7  | 10 | 4  | 9  | 3  | 5  | 2 | 2 | 0 | 0 |
| 15 | 12 | 15 | 12 | 15 | 2  | 15 | 0  | 12 | 0  | 8 | 0 | 2 | 0 |

FIRST BLOCK (rows 1–3)
SECOND BLOCK (rows 4–7)

FIG. 1C
PRIOR ART

AFTER EXPANSION

FIG. 2A
PRIOR ART

ORIGINAL DATA

COMPRESSED CODE = DOT PATTERN

IRREVERSIBLE COMPRESSION

FIG. 11B

AFTER EXPANSION

FIG. 12A

ORIGINAL DATA

FIG. 12B

IRREVERSIBLE COMPRESSION SYSTEM AND METHOD FOR BIT MAP IMAGES

BACKGROUND OF THE INVENTION

1. Field of the Invention

The present invention generally relates to an irreversible compression system and method for a bit map image, and more particularly to an irreversible compression system and method for obtaining uniform picture quality.

2. Discussion of the Related Art

In the field of bit map image data processing using printers or the like, there is a known method employing irreversible compression for storing data of an entire image in a memory by reducing the size of bit map data when the quantity of the bit map data of the entire image exceeds the capacity of the memory. In general, the method involves dividing a bit map into small cells, each having a fixed size, for example, 4×4 pixels, and converting the dot pattern of each cell into compressed data.

When a host computer transmits one page of bit map data to a printer, the data for the entire page are not necessarily transmitted all together. In particular, when a one page image comprises a large volume of data, such as a graphics image, the data is divided into blocks according to the quantity of data that the host computer can process at one time, and the image data are transmitted block by block to the printer. In such a case, the host computer determines the method of dividing the data into blocks, making it impossible for the printer to control the division.

Where bit map image data are sent in blocks to the printer, if it becomes necessary for the printer to perform irreversible compression of the transmitted bit map image data, cells will be separated one after the other from the end of the received block, and the thus separated cells will then be converted into a compressed code in the conventional printer.

However, each block may have a slightly different tone in a printed image if the irreversibly compressed data are restored to the original bit map in accordance with the conventional irreversible compression method. Since the block usually has a long narrow band shape, a band-shaped uneven tone eventually appears in the printed image when each block has a different tone.

Figure 1A:
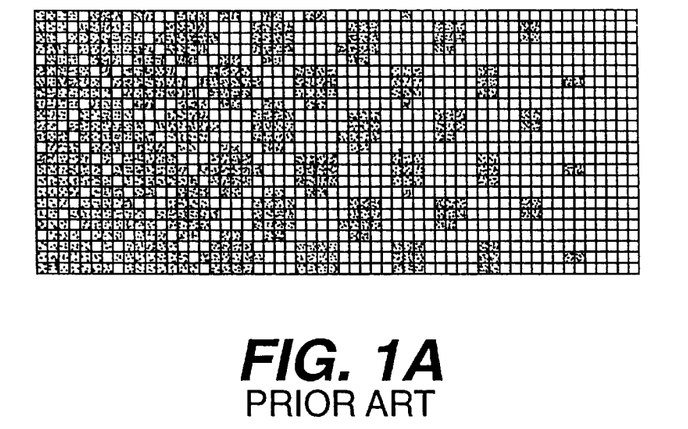
FIGS. 1A–1C are explanatory diagrams of a compression of a blocked image in a conventional printer.

For example, assume that the original bit map image is similar to that shown in FIG. 1A. A ruled line in each direction shows a boundary between pixels. A black pixel is represented by a printed dot, while a white pixel is represented by a non-printed dot. Assume that an external device transmitted this image to a printer after having divided the image into two blocks as shown in FIG. 1B.

Figure 1B:
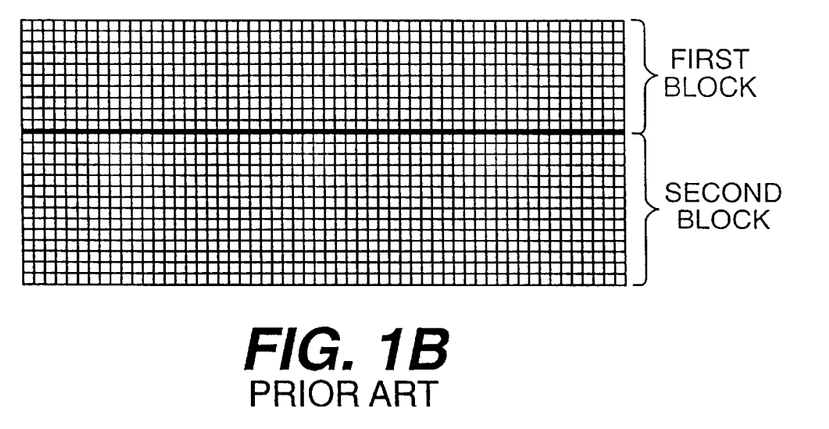

As shown in FIG. 1B, the printer has divided each of the first and second blocks into cells as indicated by a bold solid line, each cell consisting of 4×4 pixels, beginning from the upper left corner of each block. In this example, the number of pixels in the vertical direction of each block is indivisible by four, and hence cells having incomplete sizes, i.e., less than 4×4 pixels, will arise in the bottom row of each block.

Figure 1C:
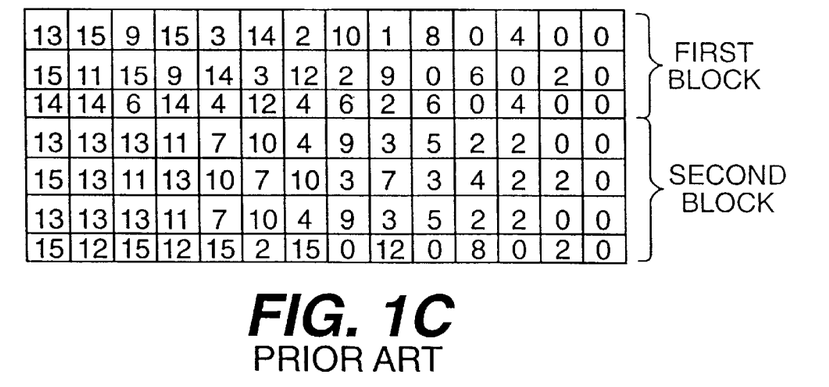

The printer then converts each cell into a compressed code (sixteen stages in this example), as shown in FIG. 1C. The compressed codes are next restored to dot patterns, whereby the bit map image is printed.

Figure 2A:
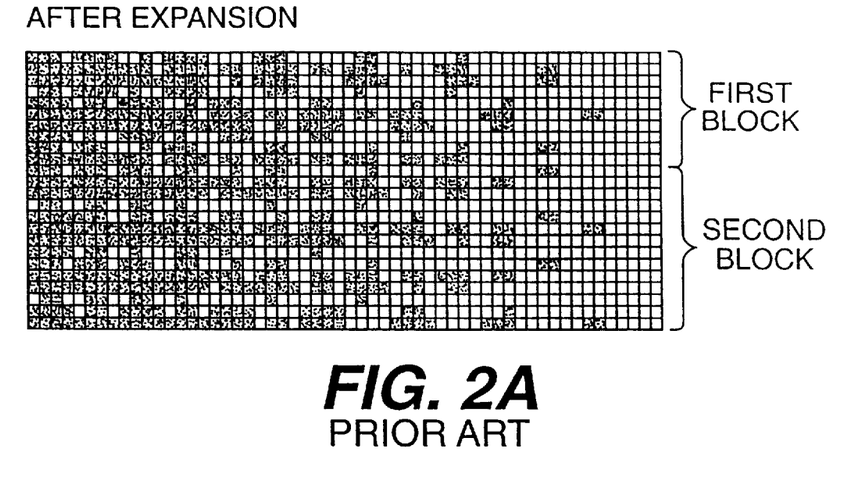
FIGS. 2A and 2B are explanatory diagrams of a print image obtained after being compressed and expanded by the conventional printer and the original image, respectively.
Figure 2B:
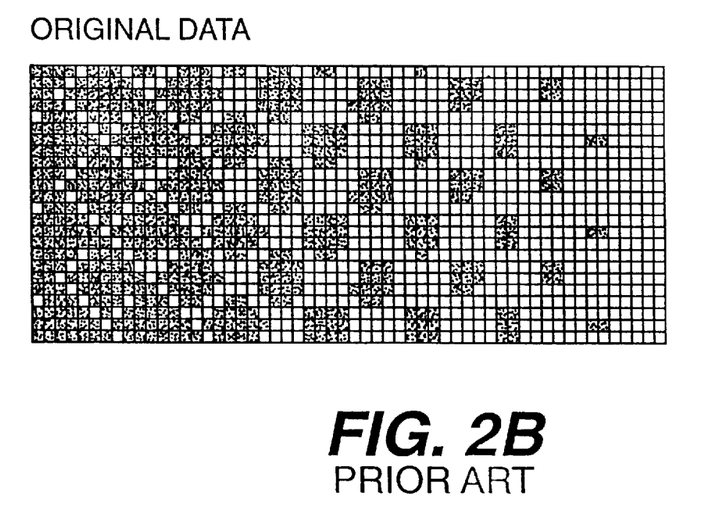

FIG. 2A shows a print obtained as a result of restoring the compressed codes of FIG. 1C, and FIG. 2B shows a print obtained as a result of directly printing the original image shown in FIG. 1A. As can be seen from a comparison of FIGS. 2A and 2B, the image of FIG. 2A, i.e., the image obtained as a result of restoring the compressed codes of FIG. 1C, is slightly deformed with respect to the direct printing of the original image as shown in FIG. 2B. This is a result of the irreversible compression.

It should be noted that each of the first and second blocks of FIG. 2A has differently deformed dot patterns. In other words, the original image shown in FIG. 2B has the repetition of the same dot patterns in the vertical direction of the image, namely, a continuous even tone in the vertical direction. On the other hand, such a vertical continuity disappears along the border between the first and second blocks in the expanded image shown in FIG. 2A, thereby resulting in different tones. As a result of this, the previously mentioned band-shaped uneven tones appear in the image of FIG. 2A.

One of the reasons for this is the presence of the incomplete cells. Specifically, when the positional relationship (phase) between the dot patterns and the cells of the original image is reviewed, there is a phase difference between the first and second blocks. This is attributed to the fact that the starting position of the cells in the second block is shifted with respect to the original dot patterns by the number of incomplete cells produced in the bottom row of the first block (two pixels in this example). As a result of this phase difference, the deformation of the original dot patterns resulting from the compression and expansion differs from block to block, so that each block has a different tone.

SUMMARY OF THE INVENTION

An object of the present invention is to make it possible to obtain even picture quality throughout the entire image by preventing each block from having different picture quality in an expanded image when blocked bit map image data are subjected to irreversible compression block by block and the thus compressed data are again expanded.

Another object of the present invention is to provide a printer for carrying out irreversible compression of blocked image data block by block upon receipt of the blocked image data, which provides even picture quality throughout the entire image by preventing a difference in picture quality in each block of a printed image when the compressed data are expanded to print.

Upon receipt of one block of blocked image data from a host computer, a printer divides coordinates X and Y of the leading end pixel of that block on print paper by the number of pixels in one side of a cell, i.e., four, the cell serving as a unit of irreversible compression. The resultant remainders RX and RY are taken as horizontal and vertical offsets of that block B. An address, obtained by subtracting the offsets RX and RY from an address ADD of the leading end pixel of that block, is set to become the leading address of the first cell, and then cells are fetched from the block. A dot pattern of each cell is converted into a compressed code. In other words, each block is divided into cells relative to the position of the block on print paper, and each cell is subjected to irreversible compression.

According to the present invention, an irreversible compression system is provided, comprising fetching means for fetching cells of bit map data from first and second adjacent blocks of bit map data, each of the fetched cells having a predetermined cell size, and converting means for converting each of the fetched cells to compressed code, wherein when the size of the first block of bit map data is indivisible by the predetermined cell size, the fetching means fetches from the first block a first incomplete cell having a first reduced size and fetches from the second block a second incomplete cell, the second incomplete cell being adjacent the first incomplete cell and having a second reduced size such that the sum of the first reduced size and the second reduced size is equal to the predetermined cell size.

In one aspect of the system according to the invention, the fetching means includes means for calculating horizontal and vertical offsets when the size of the first block of bit map data is indivisible by the predetermined cell size, and means for calculating the second reduced size in accordance with the horizontal and vertical offsets.

In another aspect of the system according to the invention, the means for calculating the second reduced size includes means for calculating a leading address of the second reduced cell by subtracting the vertical and horizontal offsets from an address of a leading end pixel of the second block.

Also according to the present invention an irreversible compression method is provided, comprising the steps of fetching cells of bit map data from first and second adjacent blocks of bit map data, each of the fetched cells having a predetermined cell size, and converting each of the fetched cells to compressed code, wherein when the size of the first block of bit map data is indivisible by the predetermined cell size, a first incomplete cell having a first reduced size is fetched from the first block and a second incomplete cell is fetched from the second block, the second incomplete cell being adjacent the first incomplete cell and having a second reduced size such that the sum of the first reduced size and the second reduced size is equal to the predetermined cell size.

In one aspect of the method according to the invention, the fetching step includes the steps of calculating horizontal and vertical offsets when the size of the first block of bit map data is indivisible by the predetermined cell size, and calculating the second reduced size in accordance with the horizontal and vertical offsets.

In another aspect of the method according to the invention, the step of calculating the second reduced size includes the step of calculating a leading address of the second reduced cell by subtracting the vertical and horizontal offsets from an address of a leading end pixel of the second block.

In the irreversible compression system and method of the present invention, cells associated with a cell arrangement positioned only in one way with respect to the entire image are fetched from each block of the image, and the cells are respectively subjected to irreversible compression. In the conventional system, as previously described, since cells are fetched one after the other from the end of each block, each block has a different cell array. Therefore, the cells are not positioned only in one way with respect to the entire image. As a result of this, each block has a different phase between the original dot patterns and the cells, and therefore each block has a different tone. Because the cells are positioned only in one way with respect to the entire image, the phase between the original dot patterns and the cells becomes same. Hence, the original identical tone is reproduced as the same tone.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate embodiments of the invention and, together with the description, serve to explain the objects, advantages and principles of the invention. In the drawings.

DETAILED DESCRIPTION OF THE PREFERRED EMBODIMENTS

Figure 3:
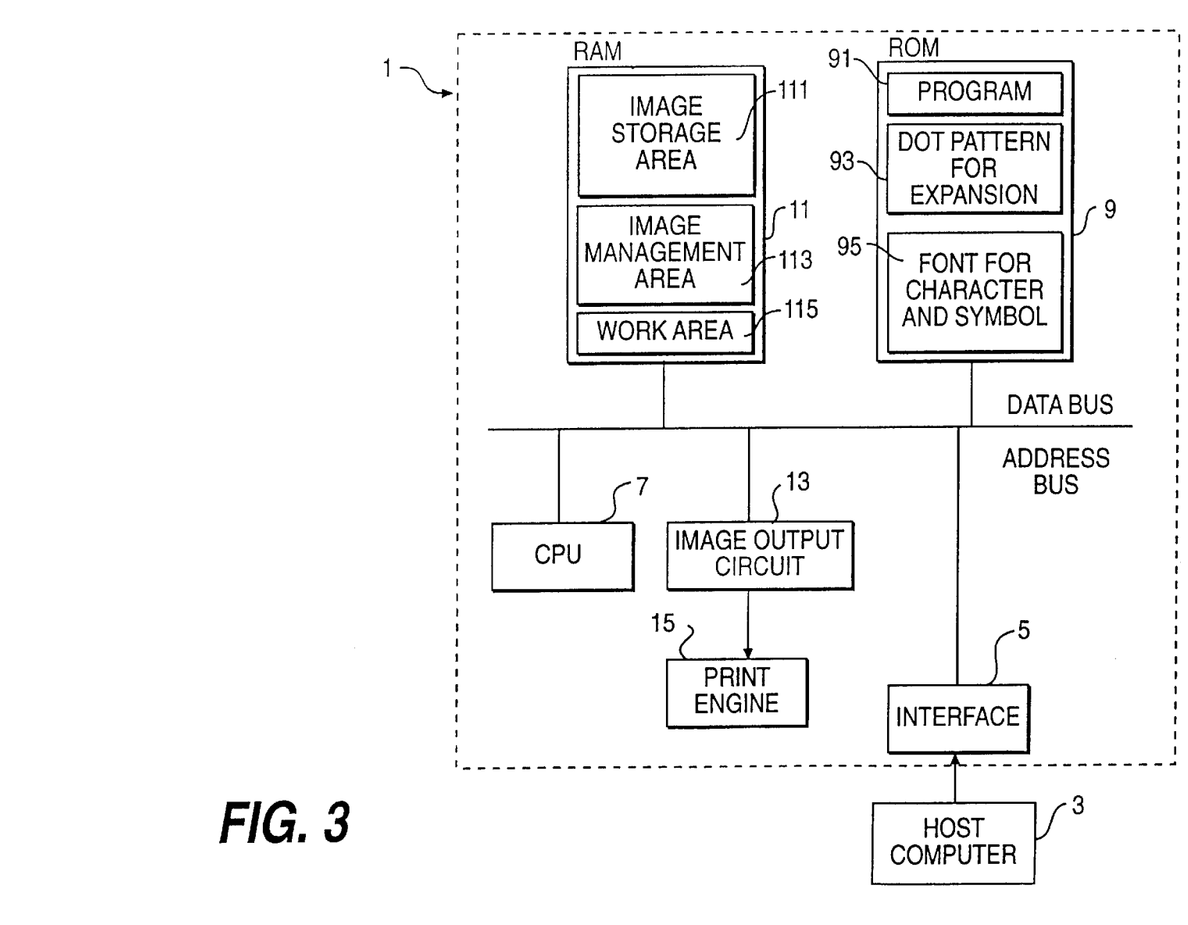
FIG. 3 is a block diagram of a configuration of a page printer to which a compression method according to one embodiment of the present invention is applied.

FIG. 3 shows one embodiment of a page printer 1 employing an irreversible compression system and method according to the present invention. As shown in FIG. 3, the printer 1 comprises an interface 5 for receiving image data from a host computer 3; a CPU 7 for processing the received image data; a ROM 9 for storing an operation program 91 of the CPU 7, dot patterns 93 for use in expanding compressed data (which will be described later), and font data 95, such as characters and symbols; a RAM 11 having an image storage area 111 for storing bit map image data (hereinafter referred to as a bit image) for one page, an image management area 113 for storing parameters (which will be described later) for the management of images, and a work area 115; a print engine 15 having a mechanism for carrying out a printing process; and an image output circuit 13 for outputting a bit image to the print engine 15.

Figure 4:
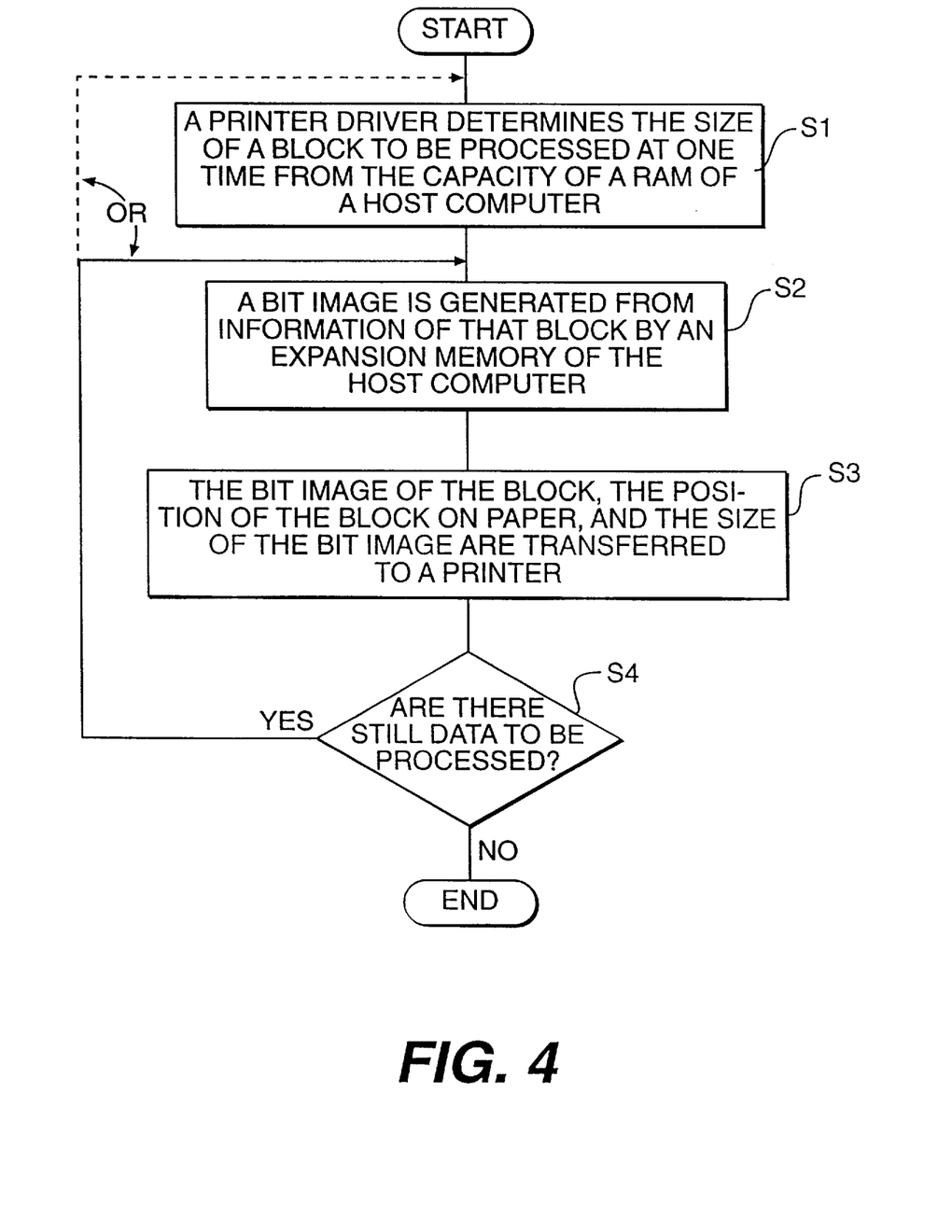
FIG. 4 is a flow chart of the steps executed when a host computer transmits a bit image to a printer according to the embodiment of FIG. 3.

The steps executed by the host computer 3 when it produces and transmits a bit image to the printer 1 will now be described with reference to FIG. 4.

First, a printer driver included within the host computer 3 determines the size of an image block to be processed at one time based on the capacity of the host computer's RAM (S1). Next, a bit image of the image block is produced by the host computer 3 and stored in an image expansion memory located within the host computer 3 (S2). Then, the bit image of the image block, the position of the image block on print paper, and the size of the image block are transferred to the printer 1 by the host computer 3 (S3). Finally, the foregoing steps are repeated for all data to be processed (S4).

The steps executed by the printer 1 when it processes the data received from the host computer 3 will now be described with reference to FIG. 5.

Upon receipt of data from the host computer 3 (S11), the printer 1 analyzes a command included in the data (S12), and determines whether or not the command is a page break command (S13). If the command is not a page break command, the printer 1 determines whether or not the received data are bit image data (S14). If the received data are not bit image data, the printer 1 processes commands other than the bit image, prepares intermediate codes relating to characters and symbols, or executes other processes (S15), and continues to receive additional data from the host computer 3.

When bit image data are received, however, the printer 1 determines whether or not both the image management area 113 and the image storage area 111 of the RAM 11 have sufficient capacity to handle the processing of the data, i.e., whether or not the image management area 113 and the image storage area 111 can be "insured" (S16 and S17). If these areas are insured, parameters (which will be described later) are generated based on the data received from the host computer 3 and are stored in the image management area 113 (S18). In addition, the received bit image data are stored in the image storage area 111 (S19).

The foregoing steps are repeated until the transfer of all data from the host computer 3 to the printer 1 is finished, and the processing will proceed to an output processing step when a page break command is received (S20) at which point processing of a subsequent page will be further continued.

In the above process, if at least one of the image management area 113 and the image storage area 111 is determined to not have sufficient capacity, i.e., cannot be insured, because, for example, a large quantity of data is received from the host computer (S16, S17), the bit image data stored in the image storage area 111 will be subjected to irreversible compression (S22). As a result of this irreversible compression, the volume of data of the previously produced image is compressed, whereby a free area of memory is obtained. This allows subsequent data to be received.

Figure 5:
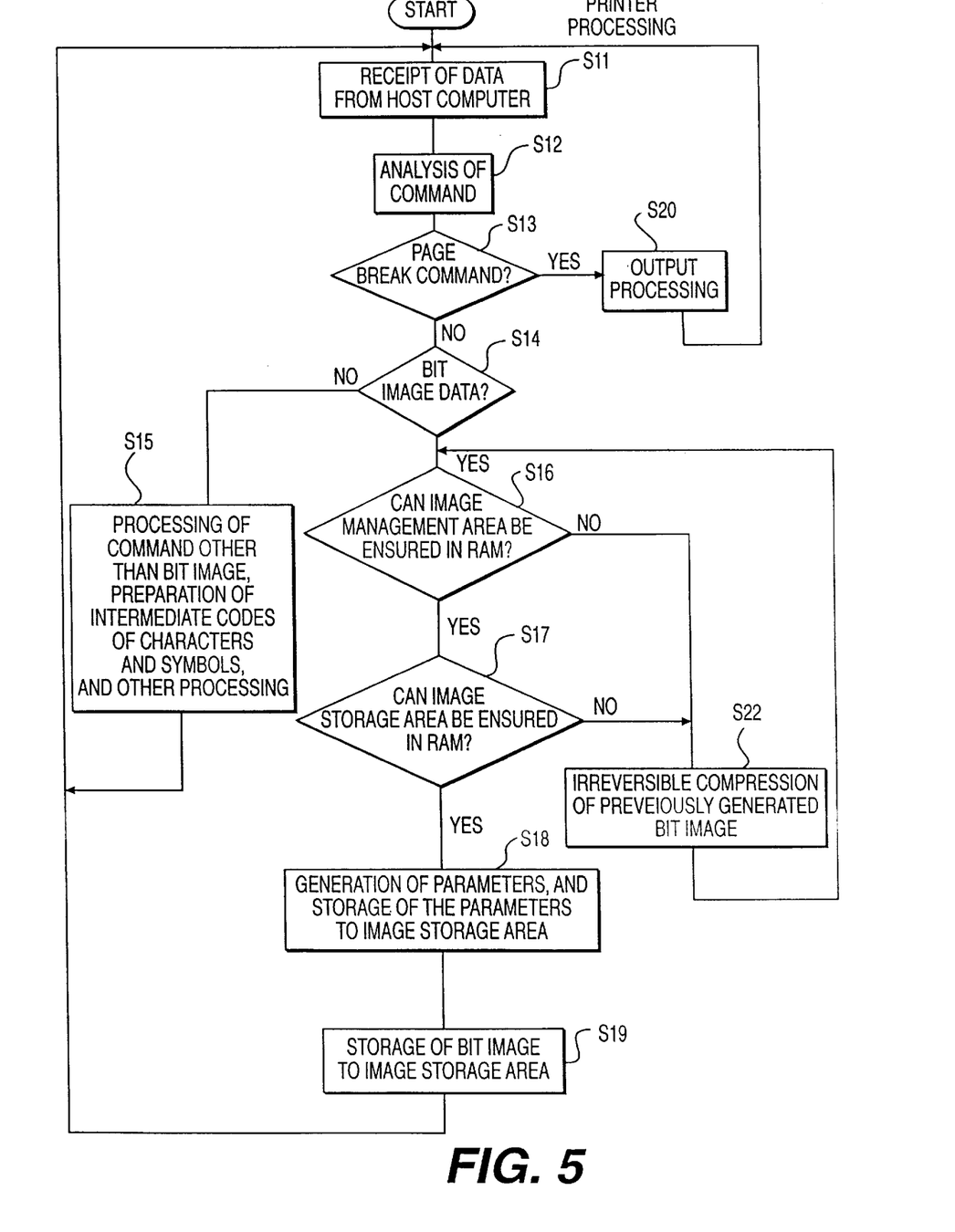
FIG. 5 is a flow chart of the steps executed when the printer processes the data from the host computer according to the embodiment of FIG. 3.
Figure 6A:
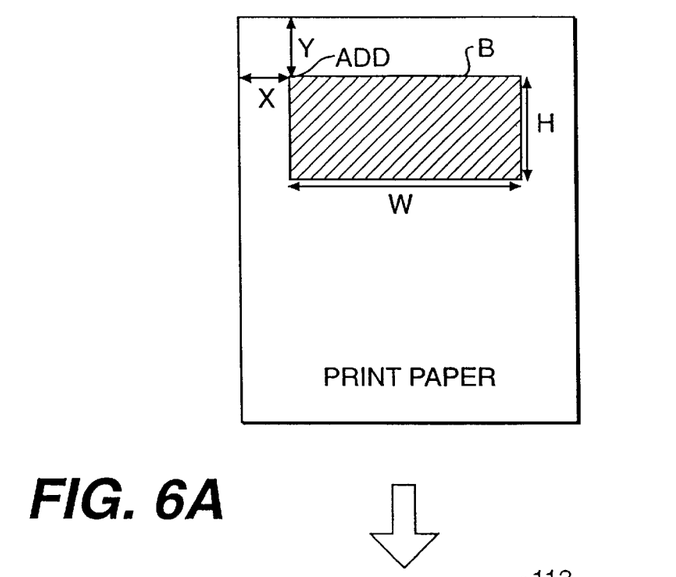
FIGS. 6A–6B are explanatory diagrams showing the generation of parameters in step S18 of FIG. 5.
Figure 6B:
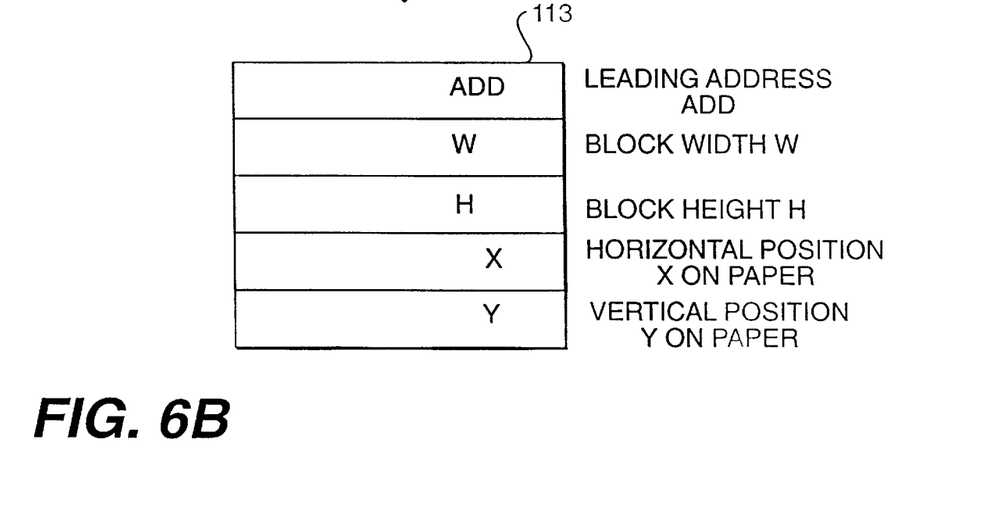

FIGS. 6A and 6B show the generation of parameters executed in step S18 of FIG. 5. As previously explained, when the host computer 3 transmits a bit image to the printer 1 in blocks, information relating to the position of the block on paper as well as the size of the block is also transmitted, together with the bit image. As shown in FIG. 6A, based on this information, the printer 1 obtains an address ADD (leading address) of the upper left pixel (head end) of the block B, a horizontal position X and a vertical position Y of the head end of the block B with respect to the upper left edge of the paper, and a horizontal width W and a vertical height H of the block B. These data are stored as parameters in the image management area 113 as shown in FIG. 6B.

Figure 7:
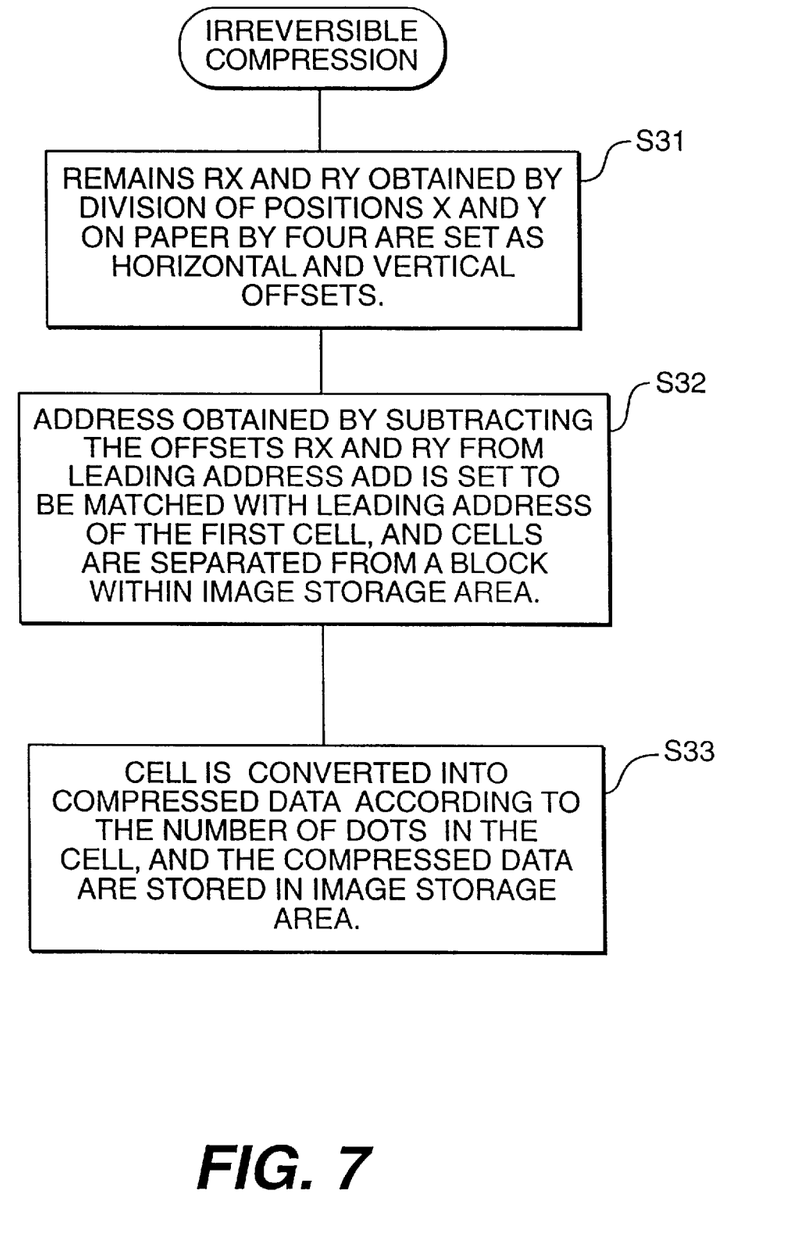
FIG. 7 is a flow chart of the steps of the irreversible compression executed in step S22 of FIG. 5.

FIG. 7 shows the steps performed during execution of the irreversible compression processing executed in step S22 of FIG. 5.

The horizontal position X and the vertical position Y of the block to be compressed are read out from the image management area 113, and the positions are divided by the selected number of pixels (four in this embodiment) in both the vertical and horizontal directions. Each group of pixels thus divided constitutes a cell serving as a unit of compression. Remainders RX and RY are obtained when the positions are not divisible by the selected number of pixels, and these remainders are set as horizontal and vertical offsets (S31).

The positional relationship (phase) between the first cell and the block is determined such that an address obtained as a result of the subtraction of the offsets RX and RY from the leading address ADD of the block matches the leading address of the first cell of that block. Each cell is fetched from the bit image of that block within the image storage area 111 (S32).

Figure 8:
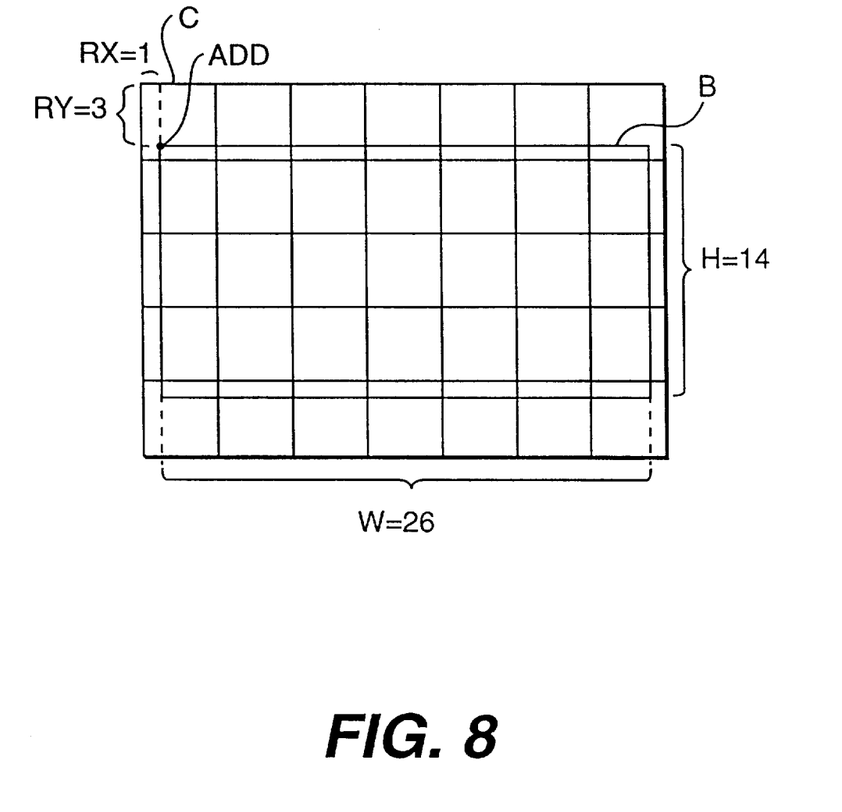
FIG. 8 is an explanatory diagram of an example of the cell fetching executed in step S32 of FIG. 7.

An example of the fetching of a cell will be described more specifically with reference to FIG. 8. As shown in FIG. 8, the horizontal offset RX of the block B is one pixel, the vertical offset RY is three pixels, the horizontal width W is 26 pixels, and the vertical height H is 14 pixels. In this case, the positional relationship between the cell C and the block B is determined such that the first cell starts from the position shifted leftward from the leading address ADD of the block B by only RX=one pixel, and upward by only RY=three pixels.

Eventually, the sizes of the cells located along the upper, lower, left, and right edges of the block B do not form complete 4×4 pixels cells and are, therefore, incomplete. If there is another block adjoining any one of the upper, lower, left, and right sides of the block B, however, cells within the block B and cells within the adjoining block will be matched in position with each other to complete any incomplete cells. In other words, the cell arrangement positioned only in one way with respect to the entire image is applied to all of the blocks.

After the cells have been fetched in this way, each cell is converted into a compressed code. The compressed code is again stored in the image storage area 111 (S33). The cell is then converted into the compressed code by directly using the number of black pixels in the cell as a compressed code. For example, if the number of black pixels within the cell is zero, its compressed code (decimal notation) is 0. In this way, a compressed code of 1 is obtained for one black pixel, a compressed code of 2 is obtained for two black pixels, . . . , a compressed code of 15 is obtained for fifteen black pixels and for sixteen black pixels. In the case of cells having incomplete sizes, the number of black pixels is obtained by proportional calculation on the assumption that the size of the cells is 4×4 pixels. The thus obtained number of black pixels is used as a compressed code.

By virtue of such compression, the volume of data of the image is reduced almost to a quarter of the original volume.

Figure 9:
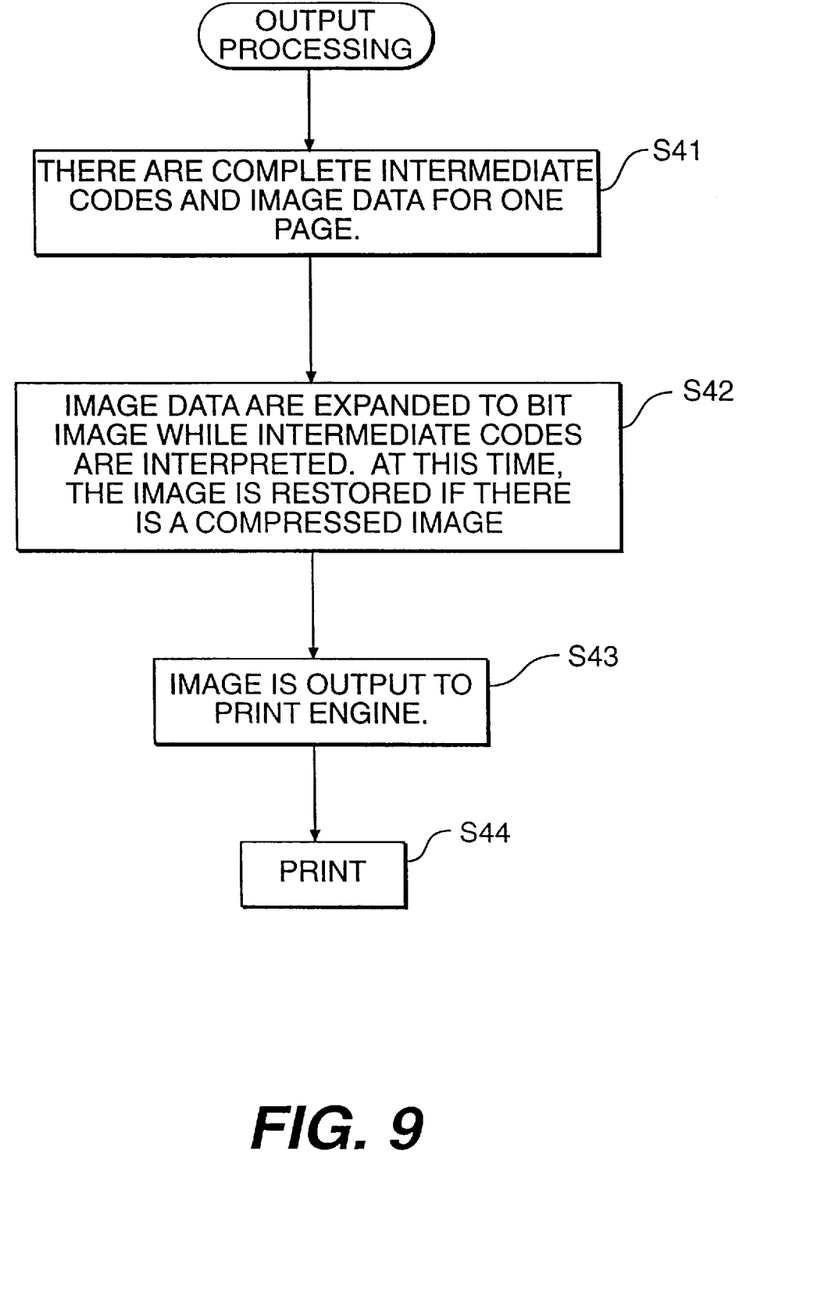
FIG. 9 is a flow chart of the output processing flow executed in step S20 of FIG. 5.

FIG. 9 shows the steps executed during the output processing executed in step S20 of FIG. 5.

First, it is ascertained that all image data for one page are complete (S41). In this embodiment, the image data are in the form of intermediate codes, a bit image, or the foregoing compressed codes. Even if there is a partially uncompressed bit image in the image data, the uncompressed image is once subjected to irreversible compression to be matched with compressed portions when the bit image includes the compressed and coded portions. The image data are expanded to a bit image for one page or for each band while the intermediate codes of these portions are interpreted (S42). At this time, when the image is a compressed code, the compressed code is restored to a dot pattern using the dot pattern for expansion 93 located within the ROM 9. The dot image obtained through expansion and restoration is output to the print engine 15 (S43), and the dot image is then printed (S44).

Figure 10:
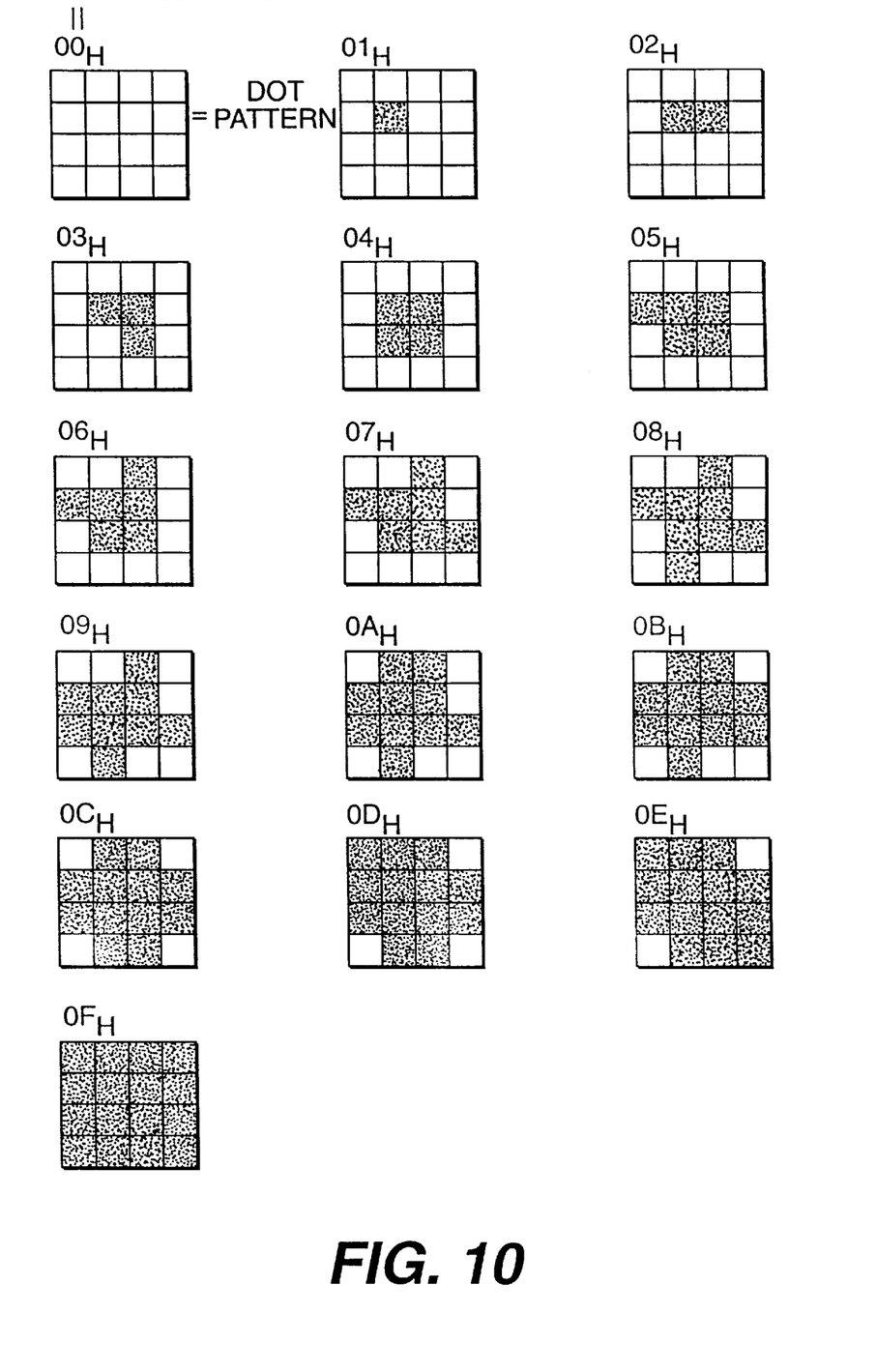
FIG. 10 is an explanatory diagram of examples of expansion dot patterns.

FIG. 10 shows several examples of the expansion dot pattern 93 used in restoring the compressed code to a dot pattern.

As shown in the FIG. 10, 16 types of dot patterns, each consisting of 4×4 pixels and each having a different number of black pixels, are set with respect to a compressed code of 16 stages (hexadecimal notation). These dot patterns are not necessarily matched with the original dot patterns before compression in terms of the arrangement of black pixels, but they are set to be matched with each other in terms of the number of black pixels. If the sizes of the cells obtained after compression are not 4×4 pixels, the pixels within the dot patterns corresponding to the incomplete cells will be used.

Figure 11A:
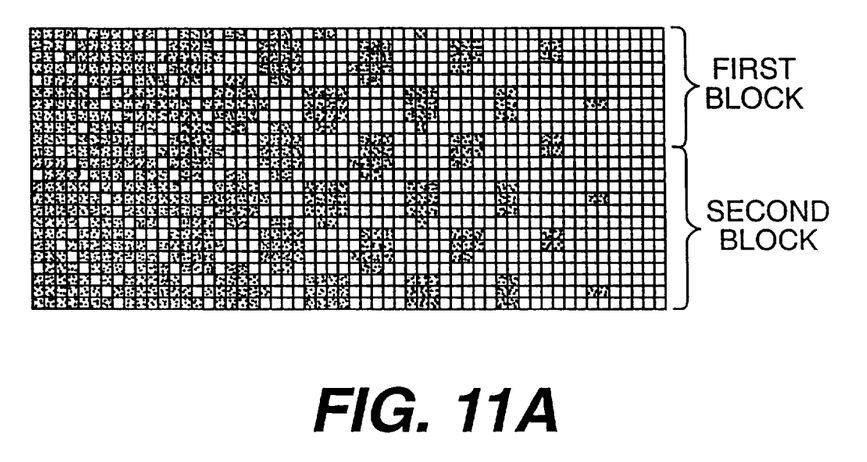
FIGS. 11A–11B are explanatory diagrams of an irreversible compression carried out according to the embodiment of FIG. 3.
Figure 11B:
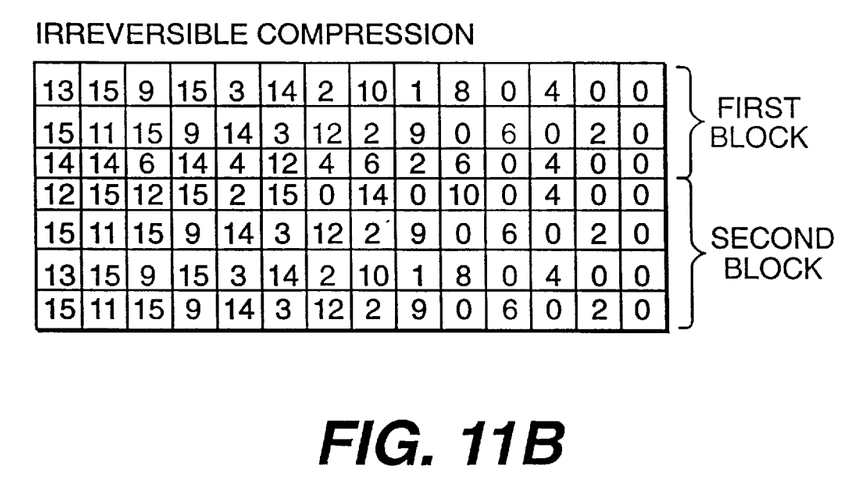

FIGS. 11A and 11B show the irreversible compression carried out in the above embodiment. In this example, a printer receives a dot pattern, which is the same as that shown in FIG. 1A, as an original dot pattern. Assume the upper left end (top end) of the first block corresponds to the top end of the paper on which the image is to be printed.

As shown in FIG. 11A, the horizontal and vertical offsets RX and RY of the first block are zero and the leading end of the first cell is positioned at the head end of this block. Cells, each having a size of 4×4 pixels, are fetched one after the other from the first block. As a result, incomplete cells of 4×2 pixels are fetched from the bottom row of the first block.

In the second block, the horizontal and vertical offsets RX and RY are respectively set to 0 and 2, and hence the leading end of the first cell of the second block is positioned at the position shifted by only two pixels from the head end of the second block. Thereafter, cells are fetched one after the other from the second block. Namely, the cells of the second block are positioned so as to be matched with the incomplete cells of the first block.

In other words, in accordance with the cell arrangement positioned only in one way with respect to the entire image, cells associated with this cell arrangement are fetched from each block. Accordingly, the phase between the dot patterns and the cells is consistent throughout the entire image, thereby preventing each block from having a different phase.

FIG. 11B shows a compressed code (in decimal notation) obtained as a result of irreversible compression of each of the cells fetched in the manner as previously mentioned.

Figure 12A:
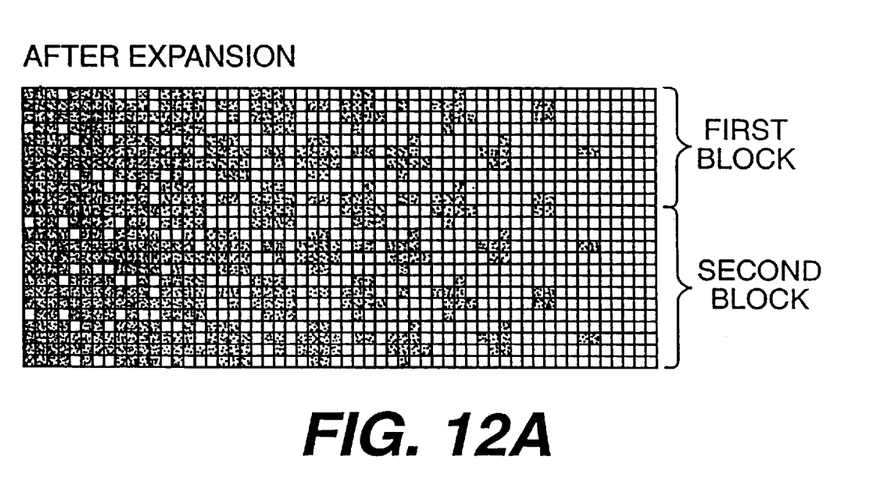
FIG. 12A–12B are explanatory diagrams of a printed image and an original image, respectively, according to the embodiment of FIG. 3.
Figure 12B:
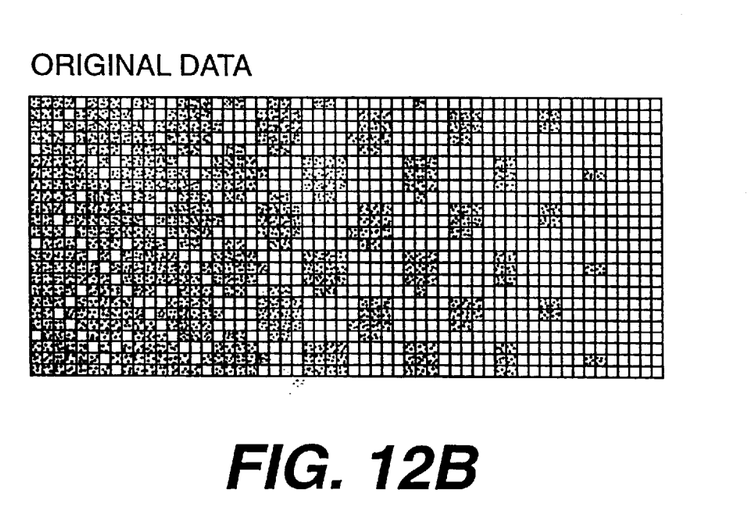

FIG. 12A shows a print result obtained by the expansion of the compressed code, and FIG. 12B shows the original image. As can be seen from the drawings, the print result shown in FIG. 12A has deformations resulting from compression and expansion when compared with a dot pattern of the original image shown in FIG. 12B. However, the first and second blocks have similar deformations, and there is no difference in deformation between the blocks. Hence, the tone of the original image remains vertically even in the print result, and there is no uneven tone due to the division of the image into blocks.

It is possible to carry out the present invention in various forms other than the illustrative embodiment described above. For example, the present invention is applicable not only to printers, but also to computers and various other devices which process bit map images.

According to the present invention, there arises no difference in picture quality between blocks in an expanded image, and an even picture quality is obtained throughout the entire image when blocked image data are subjected to irreversible compression block by block, and the compressed data are expanded again.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An irreversible compression system comprising:

fetching means for fetching cells of bit map data from first and second adjacent blocks of bit map data, each of the fetched cells having a predetermined cell size; and converting means for converting each of the fetched cells to compressed code;

wherein when the size of the first block of bit map data is indivisible by the predetermined cell size, the fetching means fetches from the first block a first incomplete cell having a first reduced size and fetches from the second block a second incomplete cell, the second incomplete cell being adjacent the first incomplete cell and having a second reduced size such that the sum of the first reduced size and the second reduced size is equal to the predetermined cell size.

2. The irreversible compression system of claim 1, wherein the fetching means includes:

means for calculating horizontal and vertical offsets; and means for calculating the second reduced size in accordance with the horizontal and vertical offsets when the size of the first block of bit map data is indivisible by the predetermined cell size.

3. The irreversible compression system of claim 2, wherein the means for calculating the second reduced size includes means for calculating a leading address of the second reduced cell by subtracting the vertical and horizontal offsets from an address of a leading end pixel of the second block.

4. An irreversible compression method comprising the steps of:

fetching cells of bit map data from first and second adjacent blocks of bit map data, each of the fetched cells having a predetermined cell size; and converting each of the fetched cells to compressed code;

wherein when the size of the first block of bit map data is indivisible by the predetermined cell size, a first incomplete cell having a first reduced size is fetched from the first block and a second incomplete cell is fetched from the second block, the second incomplete cell being adjacent the first incomplete cell and having a second reduced size such that the sum of the first reduced size and the second reduced size is equal to the predetermined cell size.

5. The irreversible compression method of claim 4, wherein the fetching step includes the steps of:

calculating horizontal and vertical offsets; and calculating the second reduced size in accordance with the horizontal and vertical offsets when the size of the first block of bit map data is indivisible by the predetermined cell size.

6. The irreversible compression method of claim 5, wherein the step of calculating the second reduced size includes the step of calculating a leading address of the second reduced cell by subtracting the vertical and horizontal offsets from an address of a leading end pixel of the second block.

\* \* \* \* \*